United States Patent [19]

Gardner

[11] Patent Number: 4,987,503
[45] Date of Patent: Jan. 22, 1991

[54] METHOD TO PRODUCE PRE-RECORDED TAPE CASSETTES

[76] Inventor: John P. Gardner, Gresson, Grotherington Fields, Grotherington Cross, Nr. Cheltenham, Glos, United Kingdom

[21] Appl. No.: 92,327

[22] Filed: Sep. 2, 1987

[51] Int. Cl.[5] .............................................. G11B 5/008
[52] U.S. Cl. ................................... 360/90; 242/56 R
[58] Field of Search .................. 360/90, 91, 92, 15, 360/16, 17; 156/506, 507, 518, 519, 520; 242/56 R, 58.3, 58.5

[56] References Cited

U.S. PATENT DOCUMENTS

| | | | |
|---|---|---|---|
| 3,363,852 | 1/1968 | Maxey | 242/53.12 |
| 3,519,762 | 7/1970 | Morris | 179/100.2 |
| 3,637,153 | 1/1972 | King | 242/56 |
| 3,662,970 | 5/1972 | Hoffman | 242/180 |
| 3,679,842 | 7/1972 | Ahy | 179/100.2 |
| 3,722,810 | 3/1983 | Kendall | 242/56 R |
| 3,797,770 | 3/1974 | Hosoda et al. | 156/506 |
| 3,864,732 | 2/1975 | Grindley et al. | 360/92 |
| 3,875,588 | 4/1975 | Bennett | 360/91 |
| 4,093,151 | 6/1978 | Karsh | 242/198 |
| 4,113,196 | 9/1978 | Rehklau | 242/56 R |
| 4,652,941 | 3/1987 | Pfannkuch | 360/18 |
| 4,657,197 | 4/1987 | Farrow | 242/56 R |
| 4,752,842 | 6/1988 | Odagiri | 360/91 |

FOREIGN PATENT DOCUMENTS

| | | |
|---|---|---|
| 1424495 | 12/1968 | Fed. Rep. of Germany . |
| 2921970 | 12/1980 | Fed. Rep. of Germany . |
| 995134 | 8/1961 | United Kingdom . |
| 1043645 | 9/1966 | United Kingdom . |
| 11042581 | 2/1968 | United Kingdom . |
| 1124158 | 8/1968 | United Kingdom . |
| 1171006 | 11/1969 | United Kingdom . |
| 1192781 | 5/1970 | United Kingdom . |

*Primary Examiner*—David J. Severin
*Attorney, Agent, or Firm*—Ross, Howison, Clapp & Korn

[57] ABSTRACT

A conventional video recorder has a top plate 2 mounting a tape supply spool 22 and tape take-up spool 22a upon a common shaft 19. A recording assembly 6 has a conventional video recording drum and combines with a master cassette holder 4 to complete a cassette recording station. A roller system guides the tape from the supply spool 22 through the recording station to the tape-up spool 22a. Stepper motors 3 provide rim drive to the the spools 22 and 22a and vacuum troughs 8 and 9 and associated photoelectric devices provide for speed control of the tape transport functions as a whole to ensure that tape is conveyed at a uniform speed without slack.

11 Claims, 3 Drawing Sheets

METHOD TO PRODUCE PRE-RECORDED TAPE CASSETTES

TECHNICAL FIELD OF THE INVENTION

This invention relates to a method and apparatus for the production of pre-recorded magnetic tape cassettes.

BACKGROUND OF THE INVENTION

Audio, video and data information is commonly distributed recorded on magnetic tape enclosed in a plastic housing called a cassette. Many different designs of cassettes have been produced and many are still being proposed for a variety of different purposes. Currently, the most well known types are the Phillips "compact" cassette for audio and data information and the JVC "VHS" cassette for video information.

Magnetic tape is manufactured in rolls many thousands of metres long and thus sufficient for many cassettes. This tape is wound into the plastic housings of cassettes using a special machine known as a loader. The information may be recorded onto the magnetic tape after it has been loaded into the cassette ("in-cassette duplication") or before ("reel-to-reel duplication"). If it is recorded onto the tape before being wound, many copies of the information may be recorded on one roll of tape. A magnetic marker known as a cue tone is recorded between each copy of the information in order that the loader can detect the correct point to complete one cassette and start the next.

In analog audio cassette production (and some data cassettes), programme material can be recorded in reel-to-reel duplication onto use tape, special machines having been developed for this purpose. Typically, use tape equivalent to about 30 to 40 C60 cassettes is recorded in this way.

This arrangement inevitably means that audio cassette reel-to-reel recording equipment is somewhat bulky, a recording deck having a relatively large surface area in order to accomodate the supply spool and take-up spool in side-by-side relationship. In practice, however, this is a relatively minor disadvantage in a conventional audio context. The recorded signals have a comparatively small band width in conventional audio copying such that recording can be carried out at a very high speed without loss of recording quality. For example, recording may be carried out at from 32 to 128 times playback speed. This enables highly productive audio cassette recording operations to be set up with relatively few copier machines so that the relative bulk of the machines is at least tolerable.

In video recording, the recorded signals are of much higher bandwidth. Recording of such signals cannot be carried out at high speed without serious loss of recording quality. Even a recording speed 50% higher than playback speed will normally result in an unacceptable drop in quality so that in general recording speed will be equal to retrieval or playback speed.

Because of this relatively slow speed of recording, many more copiers are needed for video copying than in audio recording, several thousands of copiers typically being used in video copying. Video copiers having the bulk of audio open spool copiers would require about 400 percent more space than an in-cassette copier and this is totally unacceptabe. The same applies to high bandwidth audio copying e.g. R-DAT and S-DAT format.

For these reasons, slow speed in-cassette copying of video tapes has remained customary practice since the relevant cassette formats were introduced. However, the method has always been regarded as unsatisfactory for a number of reasons. First, the process is labour intensive due to the requirement to change the cassette after each transfer of information. Secondly, the mechanisms which handle the cassettes in the players are inherently complex and sufficiently prone to unreliable performance that they can give significant practical problems in a heavy usage environment. Thirdly, since the players have to start and stop in-between each cassette and each cassette contains tape which may have come from different rolls of varying quality, it is neccessary to sample each one after the recording is complete to ensure the process has proceeded correctly.

Finding a solution to the problems and particularly the slow production speed of existing video copiers has been the subject of much activity in the industry. This has largely been without success. One proposal which has achieved a measure of success, however, is the Sony Sprinter system. In this system, a master tape is passed in contact with a slave tape through a recording station at which the two tapes are pressed together so that recording onto the slave tape takes place by induced print-through. Although this system can operate at high speed (since the two tapes are stationary relative to one another at the print station), quality recording requires a very strongly recorded master tape which is difficult to produce, production requiring specialist expensive recording techniques. The print-through recorder is also itself expensive to produce since video copiers for commercial cassette production operations represent a small market, whose supply involves the economic disadvantages of small scale production operations. Such economic disadvantages are, of course, avoided in the case of conventional direct cassette copiers since these are closely modelled on similar video cassette copying equipment mass produced for the very large international domestic market (or are indeed identical machines).

Tape transport involving concentric spools, i.e. a take-up and supply spool rotatable on a common shaft so as to have parallel juxtaposed planes of rotation, has been employed in certain applications. However, this system has not previously been proposed for recording of large bandwidth material such as is the case in video recording.

SUMMARY OF THE INVENTION

According to one aspect of the invention, there is provided a method of producing tape cassettes prerecorded with programme material, in general signals of large bandwidth such as video material and programme material in such DAT formats as R-DAT, which method comprises transporting unrecorded use tape from a preferably rim-driven non-cassette supply spool to a preferably rim-driven non-cassette take-up spool via an active recording head which records said programme material on said tape, the speed of transport at the recording head preferably being not substantially greater than playback speed, and thereafter loading said prerecorded tape from said take-up spool into cassettes.

As will be appreciated by those skilled in the art "large bandwidth" is typically a bandwidth of more than 2 MHz especially 3 MHz and above (e.g. 4 to 6 MHz) and is characterized in that such programme material cannot be carried out at high speed without serious loss of recording quality—even a recording speed 50% higher than playback speed will normally result in an unacceptable drop in quality and thus in general the recording speed will be equal to retrieval or playback speed for such material. The invention is primarily applicable to recording operations applied to such material but embraces recording of other material, e.g. where signals can be recorded with adequate play quality at speeds of up to 35% more (e.g. 20%–30% more) than retrieval speed (such as up to 20% or 25% greater speed than retrieval speed).

In general, the supply and take-up spools are disposed for rotation about a common axis and such an arrangement is applicable in conventional audio/data recording as well as in recording video and other large bandwidth material.

Conveniently, the spools are disposed with one adjacent the other so that, when tape is spooled on each, the spooled tape forms a generally planar surface of each spool with said generally planar surfaces being parallel one to the other and interfacially juxtaposed. In other words, two empty spools have overlapping planes of rotation.

In a preferred embodiment of the invention, the supply spool is driven in rotation by a first power means e.g. an electric motor and the take-up spool is driven in rotation by a second power means e.g. an electric motor, the rotational drive speed of the motors or other power means being controlled so that without slack in the tape the transport speed of the tape relative to the recording head remains constant despite variations in spool circumference presented by the outermost loop of spooled tape on the spools. The motors or other power means may couple to their respective spools, for example, by engagement of a motor drive means with the respective spool rim. The power means referred to may each conveniently be a DC motor on a stepper motor. Rather than control the motor speed itself, control may be exercised upon gear means coupling the motor output to the spools. By such means, a single drive source may be capable through appropriate gear means to supply controlled drive to each of the two spools.

In one preferred method method of operation, successive lengths of tape each forming part of the unrecorded use tape of the supply spool have programme material recorded thereon and a cue signal on the tape to signify the points on the tape where successive lengths merge, the loading of pre-recorded tape into cassettes including a step of sensing cue signals and a step of slitting the tape laterally to effect division thereof into said successive lengths. The cue signal may be a tone recorded on the tape or an interruption in a non-programme signal (e.g. in a control track of a video tape).

In a second aspect of the invention, an apparatus for producing tape pre-recorded with programme material and in a form for loading into cassettes, comprises a recording head for recording said programme material onto said tape, means for mounting a non-cassette supply spool and a non-cassette take-up spool to the apparatus for rotation about a common axis in parallel juxtaposed planes of rotation, and means for effecting driven rotation of said spools so as in use to provide discharge of unrecorded use tape from the supply spool and take-up of recorded tape by the take-up spool.

Preferably, a tape transport track is defined by a plurality of rollers, said rollers being so arranged and disposed as to provide part of the transport track in a first plane corresponding in elevation to the plane of rotation of one of said spools and part of the transport track in a second plane corresponding in elevation to the plane of rotation of the other of said spools.

Generally, the means for effecting driven rotation of said spools comprises means engagable with the spool rims and coupled to drive-supplying power means. Preferably, the means engagable with the spool rims comprises a pair of wheels each having a frictional drive surface, one engagable with the rim of one spool and the other engagable with the rim of the other spool.

In preferred apparatus, the means for effecting driven rotation of said spools comprises a first stepper motor for driving one spool and a second stepper motor for driving the other spool.

In an embodiment of the invention particularly suited for mass production techniques means is provided to detect differences between rate of take-up of tape by the take-up spool and rate of output of tape by the supply spool, means also being provided to adjust the relative speeds of driven rotation of the two spools so that the take-up rate and output rate remain equal. The detection means may comprise photoelectric means for generating a photoelectric beam into a region to determine the presence or absence of tape in said region. Conveniently, for example, a vacuum trough has an opening into a cavity thereof in which, in use, a loop of tape is received, photoelectric means being provided to generate a photoelectric beam across a portion of the cavity to detect the presence or absence of tape in the beam path.

As a practical matter, it is a preferred feature that a first detection means operates to detect unrecorded use tape output from the supply spool for transport to the recording head and a second detection means operates to detect recorded use tape issuing from the recording head for take-up by the take-up spool.

BRIEF DESCRIPTION OF THE DRAWINGS

The following is a specific description intended to illustrate an embodiment of the invention, by way of example only, reference being made to the accompanying drawings in which.

DETAILED DESCRIPTION OF THE INVENTION

Figure 2:
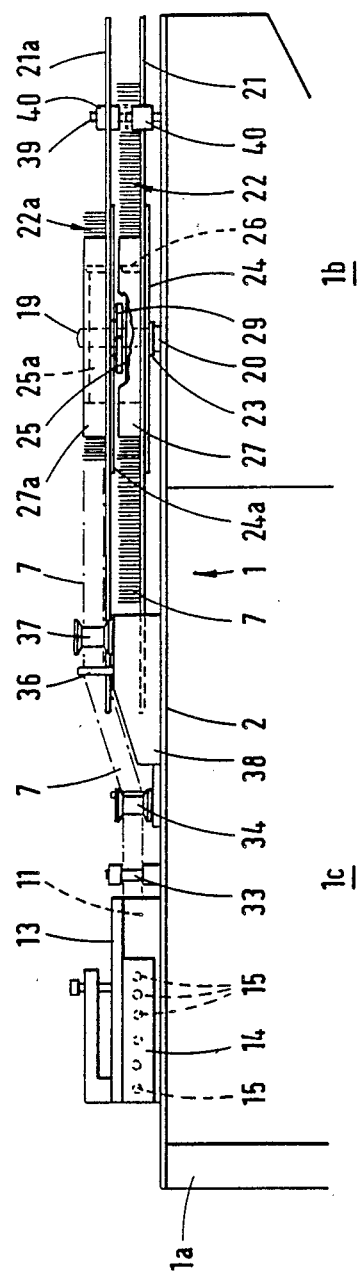
FIG. 2 is a side view of the copier shown in FIG. 1, taken from the direction of the arrow 11 of FIG. 1.
Figure 4:
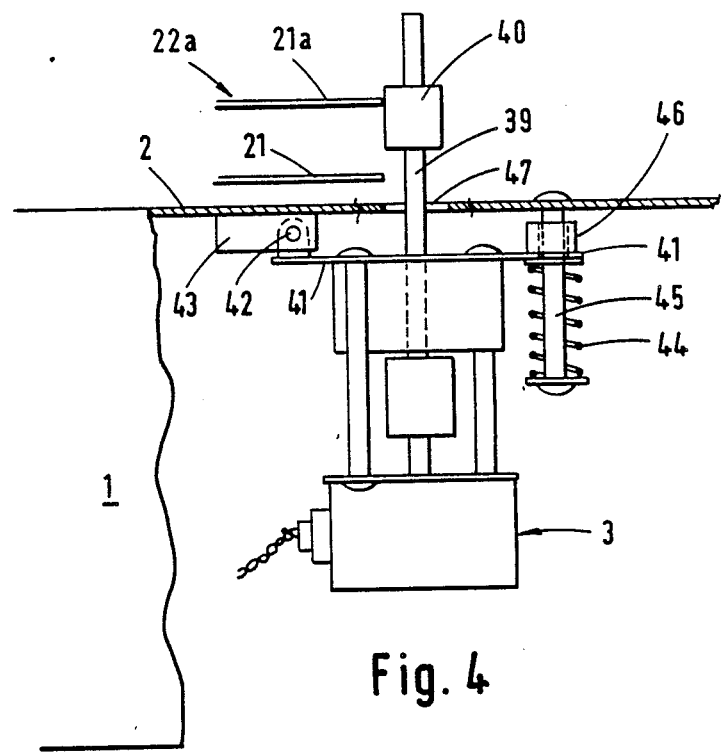
FIG. 4 is a view taken from the direction of the arrow IV of FIG. 1, part of the apparatus casing having been removed to expose internal detail.

The apparatus shown in the drawings comprises a metallic casing 1 having four sides and a base which co-operates with top plate 2 to enclose operating electronics (not shown), a master cassette drive motor (not shown) and a pair of stepper motors 3 (4-phase RS size 2), one of which is shown in more detail in FIG. 4. Front panel 1a houses various controls and displays (not shown) conventionally present in video cassette copiers. Indeed, the apparatus shown may be a conventional copier (e.g. JVC model BR-7000 E/ER), modified, with an increase in space requirements of about 25 percent, to provide for open-reel supply and take-up in place of the conventional slave cassette system. The increase in size (with respect to the JVC machine just mentioned) is represented in FIG. 2 by the side panels 1b (one only shown) added by engineering modification to side panels 1c present in the unmodified basic machine.

Mounted on the upwardly facing surface of top plate 2 is a cassette holder 4 having a forward facing cassette entry/ejection slot 5 above front panel 1a. Holder 4 combines with recording assembly 6 to complete a recording station, comprising a conventional recording drum and a tape handling mechanisms as usual in apparatus of this kind. Use tape is in use transported through the recording station, a drive capstan and associated drive motor (both not shown) being provided for the purpose as part of recording assembly 6, to receive program material transmitted by lines (not shown) to the recording drum from a remote source. In practice, a usual type copying environment may provide a plurality (typically at least 100, e.g. 500 and often several thousands) of copiers of a kind similar to that shown in the drawings, each of which is supplied with signals from a single playback machine which runs a master recording tape i.e. there may be a playback machines: copying machines ratio of say 1:250. The tape is supplied from a supply open spool 22 and taken up on a concentric take-up open spool 22a, and is designated by reference numeral 7 in FIGS. 1 and 2. In the case of the JVC copier referred to earlier, for example, a cassette holder and recording head are provided within the body of the machine, access being via a cassette entry ejection slot in the front panel of the machine. In accordance with the invention, the holder and recording apparatus are in essence transferred to the deck constituted by top plate 2 and arranged so that tape 7 is transported over the recording drum to record programme signals transmitted thereto from a program source. The holder 4 is retained in the embodiment illustrated in the drawings, and the drum kept so disposed that, the modified copier can be used in in-cassette copying mode, in that mode a cassette being run in holder 4 and tape 7 removed from the drum.

A pair of vacuum troughs 8 and 9 are also mounted to the top plate 2, one either side of the recording station. Each trough 8, 9 comprises a hollow walled aluminium block 14 machined to provide an open-topped tape-receiving cavity 10 having a tape entrance/exit 11. The upwardly facing surface of the block is machined with a channel having a rubber air seal received therein, both being designated in FIG. 1 by the reference numeral 12 and being shown in a width exaggerated by a factor of approximately 2 in the interests of clarity of depiction. A glass plate 13 seats upon seal 12 to close the top of the aluminium block with an air-tight seal.

Figure 3:
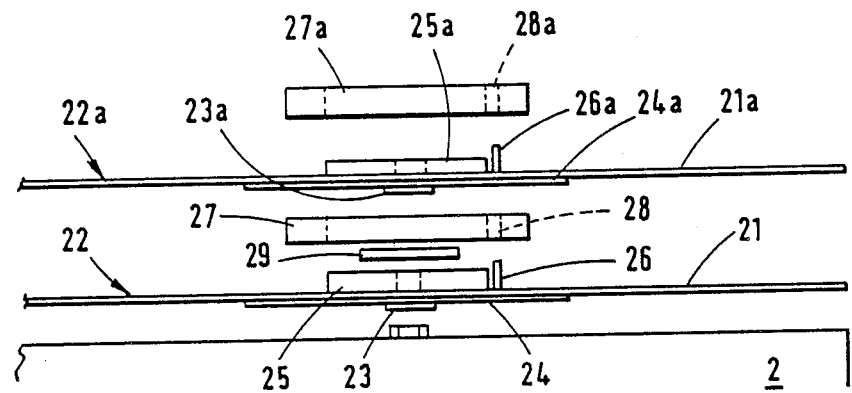
FIG. 3 is an exploded view, similar to FIG. 2 but showing part only of the copier.

Internally of the cavity 10, the wall of each block 14 is perforated with a row of vacuum holes 15 shown on an exaggerated scale is dotted lines in FIG. 3. The row of vacuum holes 15 is co-extensive with the length of the perforated wall of block 14 to enable vacuum to be applied along the entirety of the wall. Vacuum is supplied to the blocks 14 from a source (not shown) via vacuum lines 16. Rollers 17 prevent contact of tape 7 with the block walls at the block extremeties whilst studs 18 prevent the tape loop within cavity 10 from completely leaving the vacuum troughs.

Photoelectric devices (not shown) transmit a series of beams across the width of trough cavities 10 to detect the presence/absence of tape at any particular position. Signals are transmitted in response to detecting the position of the tape loop inner end to stepper motors 3 to regulate their speed. Photoelectric means (such as paired light-emitting diodes and light-sensitive photodiodes) for the above purpose are well-known in the art as is associated control circuitry for regulating the speed of servo motors and stepper motors (see for example, Bagozzi U.S. Pat. No. 3,888,480) and further disclosure thereof herein is not necessary as such knowledge will be within the capabilities and experience of those skilled in the art.

Fixed shaft 19 is mounted in the center of the large area of plate 2 to the rear of the recording assembly 6 and has an associated nylon bushing 20. A plate 21 of a tape supply spool 22 has three cut-outs or windows 29 (only one shown) and is received over shaft 19, bushing 20 co-operating with spacer 23 and back plate 24 of plate 21 to space the latter from the surface of plate 2 in a plane of rotation. Back plate 24 and spacer 23 are secured to plate 21, plate 24 having a central aluminium boss 25 and stud 26 both integral therewith and received through openings in plate 21. Spool hub 27 has annular form and seats on plate 21, with boss 25 received in its opening, and locates with stud 26 by means of one of three equispaced axial channels 28 formed in its inner annular surface. Disc 29 is centrally apertured for reception over shaft 19 and seats upon the top surface of boss 25. Disc 29 thus co-operates with spacer 23a to space plate 21a of tape take-up spool 22a from the supply of tape 7 on supply spool 22, tape take-up spool 22a being in a plane of rotation parallel to the plane of rotation of supply spool 22 with the take-up spool 22a disposed interfacially adjacent supply spool 22, plate 21a being identical with plate 21 in having a back plate 24a.

Similarly, take-up spool 22a has a boss 25a identical to boss 25 received through plate 21a and a stud 26a co-operable with a channel 28a formed in a hub 27a analogous to already mentioned hub 27. As will be appreciated from the spool arrangement just described, spools 22 and 22a are each movable as a complete assembly but independently of each other.

Figure 1:
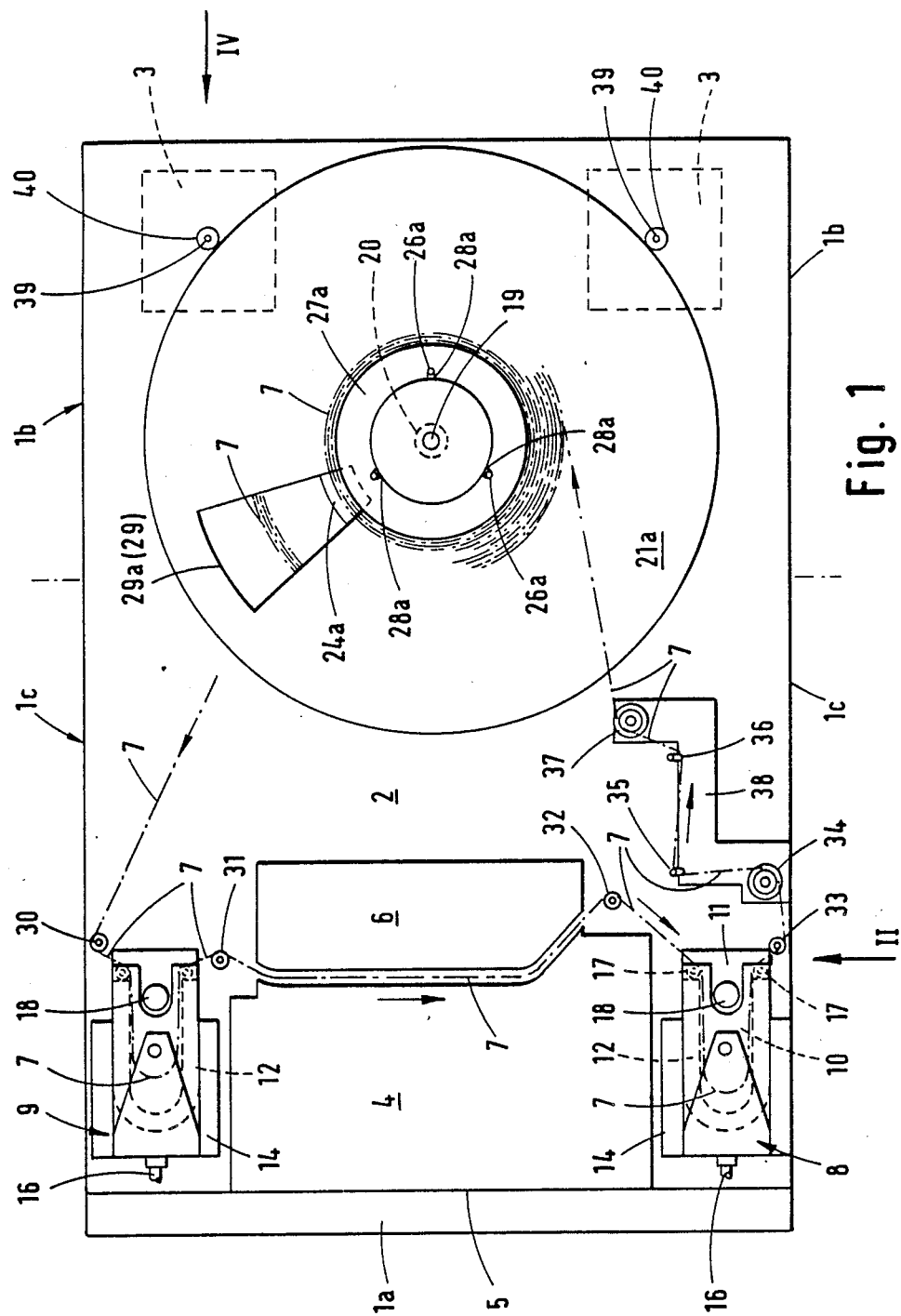
FIG. 1 is a plan view of a video cassette copier according to the invention.

A system of rollers, shown in FIGS. 1 and 2, guides tape transportation from supply spool 22 to take-up spool 22a.

Roller 30 receives tape 7 from supply spool 22 and guides it into vacuum trough 9. Roller 31 guides the tape issuing from trough 9 to the recording drum of recording assembly 6. On passing over the drum, tape 7 is guided into vacuum trough 8 by roller 32, roller 33 receiving tape issuing from the trough and guiding it to larger roller 34.

Raised block 38 is provided with a further larger roller 37, similar to roller 34, preceded by a pair of studs 35, 36. Studs 35, 36 are at different elevations, each higher than roller 34, with stud 36 at the same higher elevation as roller 37. Each stud is also inclined (FIG. 1) so as to guide the tape 7 upwardly to the plane of rotation of take-up spool 22a.

Spools 22 and 22a are mounted to shaft 19 for rotation relative thereto. Drive is connected to the spool rims from stepper motors 3 by motor shafts 39 and rubber friction wheels 40, contact of one such wheel 40 with the rim of plate 21a of take-up spool 22a being represented best in FIG. 4 of the drawings. Stepper motors 3 are mounted so that shafts 39 can be displaced from contact of wheels 40 with the spool rims when spool removal and replacement is required. Thus, the motor assembly comprises a plate 41 from which the motor proper is suspended. Plate 41 is bolted by bolt 42 to mounting plate 43 such that the plate 41 is rotatably displaceable relative to plate 43. Coil spring 44 accomodates downward displacement of plate 41, during such rotation, upon the portion of the shank of bolt 45 beneath bushing 46. Shafts 39 penetrate top plate 2 of the apparatus casing 1 through openings 47 (FIG. 4) so sized as to accomodate radial shaft displacement.

As will be evident from the drawings in combination with the foregoing description, the apparatus shown in the drawings is first provided with tape supply spool 22 and, overlying the latter, a take-up spool 22a. Tape 7, which provides a generally planar surface of the supply spool 22, is threaded through recording assembly 6, in which the tape passes over the recording drum and through a gap between a capstan and rubber roller, and the leading end secured in conventional manner to take-up spool hub 22a. The tape, of course, follows the path defined by the system of rollers commencing with roller 30 (FIG. 1), and loops into the vacuum troughs 8 and 9 as shown in FIG. 1. Tape 7 is discharged to the recording assembly 6 in operation of the apparatus by supply spool 22, discharged tape being drawn over the recording drum by the drive capstan forming part of the recording assembly. Program signals from a remote playback machine are transmitted by signal lines (not shown) to drum 6a and recorded on tape 7. Tape issuing from the recording assembly post-record is taken up by take-up spool 22a at the expense of the tape on the supply spool 22 to form a generally planar surface on the supply spool 22, the latter being disposed co-axially upon spool 22, and a system of rollers/studs guiding the tape from the lower level to the higher level. The photoelectric devices in troughs 8 and 9 detect the position of the loop of tape 7 in the trough cavities 10 with the varying discharge/take-up rates of tape caused by changing amounts of spooled tape on the spools 22 and 22a. In response, signals transmit to stepper motors 3 to regulate their speed so that tape discharge and take-up match the rate of transport of tape drawn over the recording drum by the drive capstan of recording assembly G. When supply spool 22 is empty and take-up spool 229 is full, both are removed and replaced by a full supply spool and empty take-up spool for further recording to take place. The removed take-up spool of recorded tape can be stored for later loading into cassettes or immediately loaded into a plurality of cassettes by an automated open spool-to-cassette loader of the kind available from King Instruments, Inc. or as disclosed in our copending application Ser. No. 890,078 as well as UK Patent Application No. 2,179,327. Cue tones recorded on the tape (these are present on the master recording) at desired points signify the end of the length of tape desired for any individual cassette and command the loader control system to slit and splice at appropriate points to ensure each loaded cassette has a single recording of complete programme material.

The invention includes within its scope a method of modifying an in-cassette video or other copier which method comprises converting the copier to a reel-to-reel copier having the form of any of the apparatus of the invention referred to herein (whether described with reference to the drawings or otherwise).

I claim:

1. In a method of producing tape cassettes pre-recorded with program material which method comprises:
   (i) providing a non-cassette rotatable supply spool loaded with magnetic tape spooled thereon, said spooled tape forming a generally planar surface of said supply spool;
   (ii) providing a non-cassette rotatable take-up spool to receive recorded magnetic tape;
   (iii) disposing the supply spool in a first plane of rotation;
   (iv) disposing the take-up spool in a second plane of rotation essentially parallel to said first plane of rotation;
   (v) providing an active recording head;
   (vi) transporting magnetic tape from the supply spool to the take-up spool, with rotation of said spools, via said active recording head, thereby recording program material on said tape and creating a generally planar surface of spooled tape on said take-up spool at the expense of said planar surface of tape of said supply spool; and
   (vii) loading recorded tape from said take-up spool into cassettes;
   the improvement comprising disposing the supply spool and take-up spool in juxtaposition so that the positions occupied by said generally planar spooled tape surface of said take-up spool and said generally planar surface of tape of said supply spool are interfacially adjacent.

2. A method as claimed in claim 1 which comprises disposing said supply and take-up spools for rotation about a common axis and effecting the transportation of the magnetic tape from the supply spool to the take-up spool with rotation of said spools on said common axis.

3. A method as claimed in claim 1 wherein the program material is recorded on successive integral lengths of tape each forming part of the tape of the supply spool, together with a cue signal recorded on the tape to signify the points on the tape where successive lengths merge, the loading of pre-recorded tape into cassettes including a step of sensing cue signals and a step of slitting the tape laterally to effect division thereof into said successive lengths.

4. A method as claimed in claim 1 which comprises providing a plurality of rollers defining a transport track for said tape and effecting the transportation of the tape along the transport track defined by the plurality of rollers, said rollers being so arranged and disposed as to provide part of the transport track in a first plane corresponding in elevation to the plane of rotation of one of said spools and part of the transport track in a second plane corresponding in elevation to the plane of rotation of the other of said spools.

5. A method as claimed in claim 1 which method comprises providing a remote playback apparatus, operating said playback apparatus to play back a master recording of program material for producing a recording signal and transmitting said signal to said recording head.

6. A method as claimed in claim 1 which method comprises providing detection means to detect differences between the rate of take-up of tape by the take-up spool and the rate of output of tape by the supply spool, detecting any such differences by said detection means and adjusting the relative speeds of driven rotation of the two spools in response to detected rate differences so that the take-up rate and output rate remain equal.

7. A method as claimed in claim 1 which method comprises providing first and second stepper motors and rotational drive speed control means therefor, driving the supply spool in rotation by means of the first stepper motor, driving the take-up spool in rotation by means of the second stepper motor and controlling the rotational drive speed of the stepper motors by said rotational drive speed control means so that, without slack in the tape, the transport speed of the tape relative to the recording head remains constant despite variations in spool circumference presented by the outermost loop of spooled tape on the spools.

8. A method as claimed in claim 7 which comprises coupling the stepper motors to their respective spools by engaging a motor drive means with the respective spool rim.

9. A method as claimed in claim 1 which method comprises providing means engageable with the spool rims and coupled to drive power means and effecting the transportation of the tape by effecting driven rotation of said spools.

10. A method as claimed in claim 9 which method comprises providing a pair of wheels each having a frictional drive surface and engaging one said wheel with the rim of one spool and the other with the rim of the other spool to effect rotation of said spools and the transportation of the tape.

11. A method of producing tape cassettes pre-recorded with program material which method comprises providing a shaft, mounting a supply spool and a take-up spool to said shaft, the supply spool being loaded with magnetic tape spooled thereon, connecting a leading end of said tape to said take-up spool, providing an active recording head, providing motor drive means, transporting said tape from said supply spool to said take-up spool via said acitve recording head by applying drive to the rims of said spools to cause their rotation about a common axis, transmitting program signals to said recording head as said transportation takes place so that said tape is recorded with said programme signals, providing a tape loading machine and loading programme lengths of said tape from said take-up spool into cassettes by means of said tape loading machine.

* * * * *